United States Patent
Ikawa et al.

(10) Patent No.: US 9,581,398 B2
(45) Date of Patent: Feb. 28, 2017

(54) HEAT EXCHANGER

(71) Applicant: KEIHIN THERMAL TECHNOLOGY CORPORATION, Oyama-shi (JP)

(72) Inventors: Youhei Ikawa, Oyama (JP); Takashi Terada, Oyama (JP); Hiroshi Otsuki, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 225 days.

(21) Appl. No.: 14/607,076

(22) Filed: Jan. 28, 2015

(65) Prior Publication Data

US 2015/0211817 A1    Jul. 30, 2015

(30) Foreign Application Priority Data

Jan. 29, 2014  (JP) ................. 2014-013940

(51) Int. Cl.
*F28D 21/00* (2006.01)
*F28F 21/08* (2006.01)
(Continued)

(52) U.S. Cl.
CPC ............ *F28F 21/084* (2013.01); *B22F 1/007* (2013.01); *B32B 15/01* (2013.01); *C21C 5/005* (2013.01); *C22C 21/00* (2013.01); *C22C 21/02* (2013.01); *F28D 1/05333* (2013.01); *F28F 19/06* (2013.01); *F28D 2021/0084* (2013.01); *F28D 2021/0085* (2013.01); *F28D 2021/0094* (2013.01)

(58) Field of Classification Search
CPC ..... F28F 21/084; F28F 19/06; F28D 1/05333; F28D 2021/0084; F28D 2021/0085; F28D 2021/0094; B32B 15/01; C22C 21/02; C22C 21/00; C21C 5/005; B22F 1/007
See application file for complete search history.

(56) References Cited

U.S. PATENT DOCUMENTS 7,250,223 B2 *  7/2007  Miyachi ................. F28F 19/06
                                                                    165/133
7,514,155 B2 *  4/2009  Benedictus ........ B23K 35/0238
                                                                    148/523
(Continued)

FOREIGN PATENT DOCUMENTS

JP          2011-137203          7/2011

*Primary Examiner* — Tho V Duong
(74) *Attorney, Agent, or Firm* — Mori & Ward, LLP

(57) ABSTRACT

Heat exchange tubes of a heat exchanger are formed of an alloy containing Mn (0.2 to 0.3 mass %), Cu (0.1 mass % or less), and Fe (0.2 mass % or less), the balance being Al and unavoidable impurities. A Zn diffused layer is formed in an outer surface layer portion of the peripheral wall of each heat exchange tube. $T \leq 200$, $0.57 \leq A \leq 1.5$, $D/T \leq 0.55$, and $0.0055 \leq A/D \leq 0.025$ are satisfied, where T is the thickness [μm] of the peripheral wall of the heat exchange tube, A is the Zn concentration [mass %] at the outermost surface of the outer surface layer portion, and D is the maximum depth [μm] of the Zn diffused layer. The spontaneous potential of the Zn diffused layer is lower than that of a portion of the peripheral wall located on the inner side of the Zn diffused layer.

2 Claims, 2 Drawing Sheets

(51) Int. Cl.
    *C22C 21/00*       (2006.01)
    *F28F 19/06*       (2006.01)
    *F28D 1/053*       (2006.01)
    *B32B 15/01*       (2006.01)
    *C22C 21/02*       (2006.01)
    *B22F 1/00*        (2006.01)
    *C21C 5/00*        (2006.01)

(56) References Cited

U.S. PATENT DOCUMENTS

| | | | | |
|---|---|---|---|---|
| 8,343,635 B2* | 1/2013 | Matsumoto | ......... | B23K 1/0012 |
| | | | | 148/535 |
| 2006/0141282 A1* | 6/2006 | Ueda | ......... | B23K 35/0238 |
| | | | | 428/650 |
| 2007/0122648 A1* | 5/2007 | Vieregge | ......... | B23K 35/0238 |
| | | | | 428/654 |
| 2010/0147500 A1* | 6/2010 | Minami | ......... | B23K 1/0012 |
| | | | | 165/173 |
| 2012/0237793 A1* | 9/2012 | Baumann | ......... | B23K 35/0238 |
| | | | | 428/654 |

* cited by examiner

HEAT EXCHANGER

BACKGROUND OF THE INVENTION

The present invention relates to a heat exchanger, and more particularly to a heat exchanger which is used as a condenser for a car air conditioner, an evaporator for a car air conditioner, a heater core for a car air conditioner, or a radiator, each of which is mounted on a vehicle such as an automobile.

In this specification and claims, the term "aluminum" encompasses aluminum alloys in addition to pure aluminum. Also, materials represented by chemical symbols represent pure materials.

In this specification, the term "spontaneous potential" of a material refers to the electrode potential of the material in an acidic (pH: 3) aqueous solution of 5% NaCl with respect to a saturated calomel electrode (S.C.E.), which serves as a reference electrode.

A widely used condenser for a car air conditioner includes a pair of an aluminum header tanks disposed apart from each other such that their longitudinal direction coincides with the vertical direction. A plurality of flat heat exchange tubes formed of an aluminum extrudate are disposed between the header tanks at predetermined intervals in the longitudinal direction of the header tanks in such a manner that their width direction coincides with an air-passing direction. Opposite end portions of the heat exchange tubes are connected to the two header tanks. Corrugated aluminum fins are disposed between adjacent heat exchange tubes and on the outer sides of the heat exchange tubes at the opposite ends, and are brazed to the heat exchange tubes. Aluminum side plates are disposed on the outer sides of the fins at the opposite ends, and are brazed to the fins. Such a condenser is manufactured by a method which includes simultaneously brazing the header tanks (including members for forming the header tanks), the heat exchange tubes, and the fins.

Incidentally, since such a condenser for a car air conditioner is used in a corrosive environment, pitting corrosion occurs in the peripheral walls of the heat exchange tubes within a relatively short period of time. Therefore, it is necessary to prevent occurrence of pitting corrosion, to thereby prevent leakage of refrigerant from the heat exchange tubes over a relatively long period of time.

Conventionally, there has been proposed a heat exchanger which can prevent occurrence of pitting corrosion in the peripheral walls of the heat exchange tubes within a relatively short period of time (see Japanese Patent Application Laid-Open (kokai) No. 2011-137203). In the proposed heat exchanger, each heat exchange tube is formed by extruding an alloy which contains Si in an amount of 0.1 to 0.6 mass %, Fe in an amount of 0.1 to 0.6 mass %, Mn in an amount of 0.1 to 0.6 mass %, Ti in an amount of 0.005 to 0.2 mass %, and Cu in an amount less than 0.1 mass %, the balance being Al and unavoidable impurities. Zn and Si are diffused in an outer surface layer portion of each heat exchange tube, whereby a sacrificial anode layer is formed. The peripheral wall of each heat exchange tube has a thickness of 260 μm, and the spontaneous potential of the sacrificial anode layer is 10 to 50 mV lower than the spontaneous potential of a portion of the peripheral wall of the heat exchange tube, which portion is located on the inner side of the sacrificial anode layer.

However, in the case of the heat exchanger described in the above-mentioned publication, a sacrificial anode layer is formed in an outer surface layer portion of each heat exchange tube as a result of diffusion of Zn and Si thereinto, and the spontaneous potential of the sacrificial anode layer is 10 to 50 mV lower than the spontaneous potential of a portion of the peripheral wall of the heat exchange tube, which portion is located on the inner side of the sacrificial anode layer. Therefore, the pitting corrosion prevention effect provided by the sacrificial anode layer may be insufficient.

SUMMARY OF THE INVENTION

An object of the present invention is to solve the above-described problem and to provide a heat exchanger which has enhanced pitting corrosion resistance to thereby prolong a period during which occurrence of pitting corrosion is prevented.

To achieve the above object, the present invention comprises the following mode.

1) A heat exchanger comprising heat exchange tubes formed of aluminum, and fins formed of aluminum and brazed to the heat exchange tubes, wherein each heat exchange tube is formed of an alloy which contains Mn in an amount of 0.2 to 0.3 mass %, Cu in an amount of 0.1 mass % or less, Fe in an amount of 0.2 mass % or less, and Si in an amount of 0.2 mass % or less, the balance being Al and unavoidable impurities; a Zn diffused layer is formed in an outer surface layer portion of the heat exchange tube; conditions of $T \leq 200$, $0.57 \leq A \leq 1.5$, $D/T \leq 0.55$, and $0.0055 \leq A/D \leq 0.025$ are satisfied, where T is a thickness [μm] of a peripheral wall of the heat exchange tube, A is a Zn concentration [mass %] at an outermost surface of the outer surface layer portion of the heat exchange tube, and D is a maximum depth [μm] of the Zn diffused layer; and a spontaneous potential of the Zn diffused layer is lower than a spontaneous potential of an inner portion of the peripheral wall of the heat exchange tube, the inner portion being located on the inner side of the Zn diffused layer.

In the heat exchanger of par. 1), any of the amounts of Cu, Fe, and Si contained in the alloy used to form the heat exchange tubes may be 0 mass % in some cases.

The reasons for limiting the components of the alloy used to form the heat exchange tubes of the heat exchanger of par. 1) are as follows.

Mn increases the strength of the heat exchange tubes. When the Mn content is lower than 0.2 mass %, this effect cannot be attained. When the Mn content is higher than 0.3 mass %, machinability, such as extrudability at the time of extrusion of the heat exchange tubes, becomes lower. Therefore, the Mn content must be 0.2 to 0.3 mass %.

Cu is an unavoidable impurity. In the case where the Cu content is excessively high, the corrosion speed of the entire wall of each heat exchange tube becomes excessively high, and the corrosion resistance becomes insufficient when the thickness of the peripheral wall is 200 μm or less. Therefore, the Cu content must be 0.1 mass % or less. Notably, it is preferred that the amount of Cu contained in the alloy used to form the heat exchange tubes be zero.

Fe is an unavoidable impurity. In the case where the Fe content is excessively high, the corrosion speed of the entire wall of each heat exchange tube becomes excessively high, and the corrosion resistance becomes insufficient when the thickness of the peripheral wall is 200 μm or less. Therefore, the Fe content must be 0.2 mass % or less. Notably, it is preferred that the amount of Fe contained in the alloy used to form the heat exchange tubes be zero.

Si is as an unavoidable impurity. In general, the upper limit of the Si content is 0.2 mass % or less.

In the heat exchanger of par. 1), when the thickness of the peripheral wall of each heat exchange tube is represented by T [μm], the Zn concentration at the outermost surface of the outer surface layer portion of the heat exchange tube is represented by A [mass %], and the maximum depth of the Zn diffused layer is represented by D [μm], conditions of T≤200, 0.57≤A≤1.5, D/T≤0.55, and 0.0055≤A/D≤0.025 must be satisfied, for the following reasons. Namely, according to the heat exchanger of par. 1), the Zn diffused layer formed in the outer surface layer portion of each heat exchange tube is sacrificially corroded, whereby occurrence of pitting corrosion in the peripheral wall of the heat exchange tube is restrained. As a result of repeated studies performed by the present inventors, it was found that, when the above conditions are satisfied, the maximum corrosion depth at which the progress of corrosion stops or gets saturated can be decreased to a degree corresponding to the thickness of the peripheral wall of each heat exchange tube, and that the pitting corrosion prevention effect is maintained for a long period of time because of the decreased maximum corrosion depth, as well as the decreased corrosion speed attained by setting the upper limits of the amounts of Cu, Fe, and Si contained in the alloy used to form the heat exchange tubes. In the case where the thickness T [μm] of the peripheral wall of each heat exchange tube is decreased to 200 or less in order to decrease the weight of the heat exchange tube, it is possible to decrease the maximum corrosion depth at which the progress of corrosion stops or gets saturated, by setting the ratio of the Zn concentration A [mass %] at the outermost surface of the outer surface layer portion of the heat exchange tube to the maximum depth D [μm] of the Zn diffused layer to fall within a proper range, and by setting the ratio of the maximum depth D [μm] to the thickness T [μm] to fall within a proper range.

2) A heat exchanger according to par. 1), wherein the spontaneous potential of the Zn diffused layer is 100 to 150 mV lower than that of the inner portion of the peripheral wall of the heat exchange tube, the inner portion being located on the inner side of the Zn diffused layer.

In the heat exchanger of par. 2), the spontaneous potential of the Zn diffused layer is set to be 100 to 150 mV lower than that of the inner portion of the peripheral wall of the heat exchange tube, located on the inner size of the Zn diffused layer, in order to further enhance the pitting corrosion prevention effect achieved by sacrificial corrosion of the Zn diffused layer.

According to the heat exchangers of pars. 1) and 2), the maximum corrosion depth at which the progress of corrosion stops can be decreased to a degree corresponding to the thickness of the peripheral wall of each heat exchange tube, and the corrosion speed can be decreased. As a result, the pitting corrosion prevention effect achieved by sacrificial corrosion of the Zn diffused layer can be maintained for a long period of time.

DESCRIPTION OF THE PREFERRED EMBODIMENT

An embodiment of the present invention will next be described with reference to the drawings. In the embodiment, a heat exchanger according to the present invention is applied to a condenser for a car air conditioner.

Figure 1:
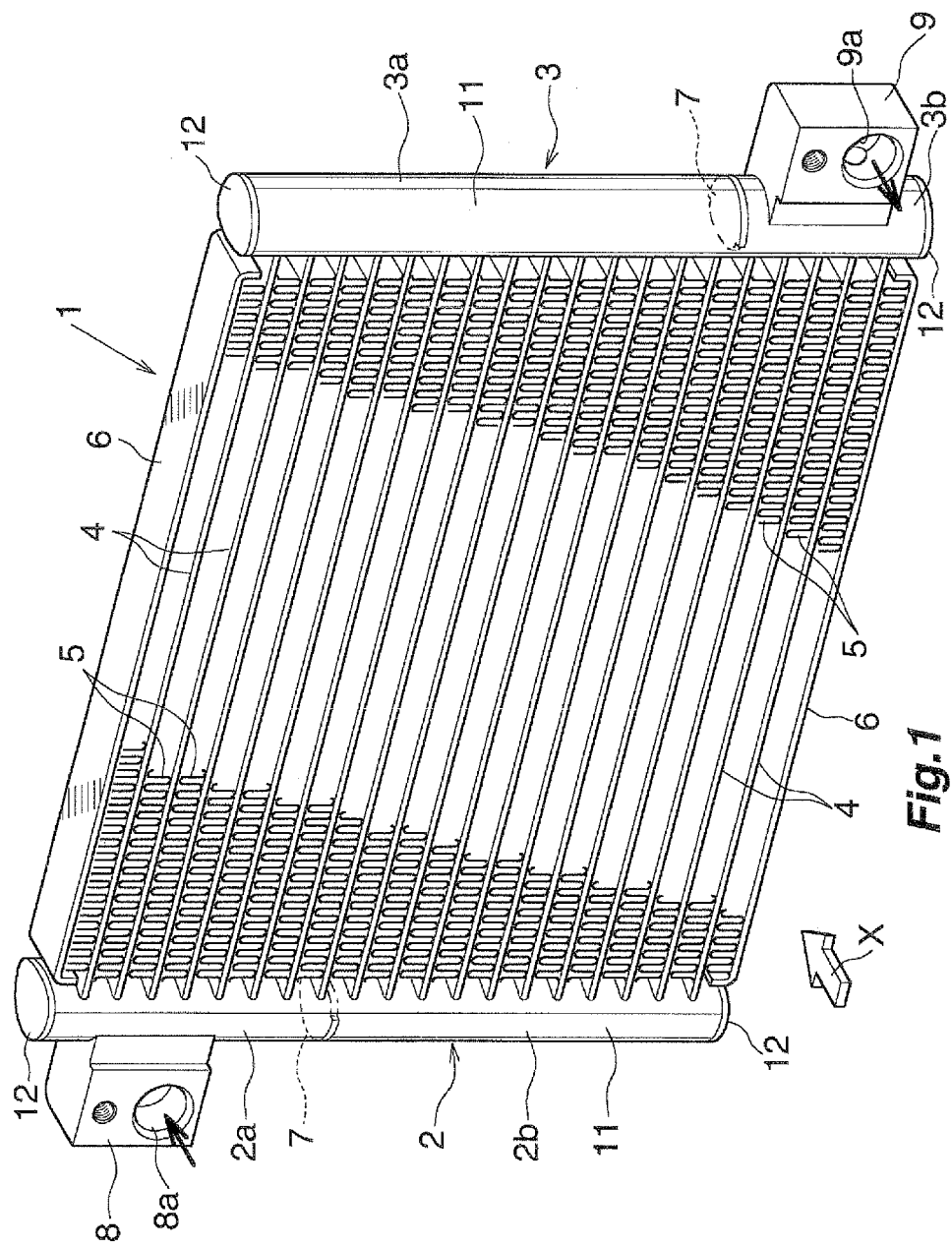
FIG. 1 is a perspective view showing the overall structure of a condenser for a car air conditioner to which a heat exchanger according to the present invention is applied.
Figure 2:
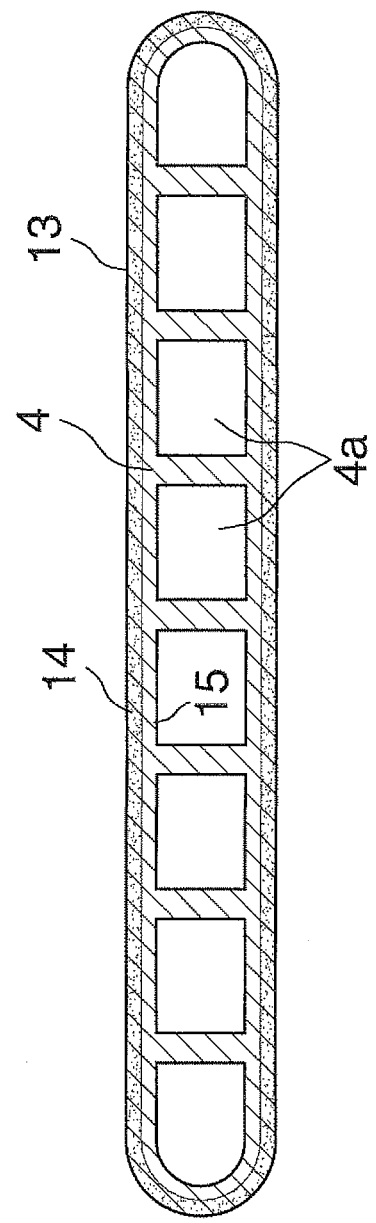
FIG. 2 is an enlarged cross-sectional view of a heat exchange tube of the condenser of FIG. 1.

FIG. 1 shows the overall structure of a condenser for a car air conditioner to which a heat exchanger according to the present invention is applied, and FIG. 2 shows a heat exchange tube of the condenser of FIG. 1 on an enlarged scale.

Notably, in the following description, the upper, lower, left-hand, and right-hand sides of FIG. 1 will be referred to as "upper," "lower," "left," and "right," respectively.

As shown in FIG. 1, a condenser 1 for a car air conditioner includes a pair of header tanks 2 and 3 formed of aluminum. The header tanks 2 and 3 extend in the vertical direction and are disposed in such a manner that they are spaced from each other in the left-right direction. A plurality of flat heat exchange tubes 4 formed of an aluminum extrudate are disposed between the header tanks 2 and 3 at predetermined intervals in the vertical direction in such a manner that their width direction coincides with an air-passing direction. Opposite end portions of the heat exchange tubes 4 are brazed to the header tanks 2 and 3. Corrugated fins 5 formed of aluminum are disposed between adjacent heat exchange tubes 4 and on the outer sides of the uppermost and lowermost heat exchange tubes 4, and are brazed to the corresponding heat exchange tubes 4. Side plates 6 formed of aluminum are disposed on the outer sides of the uppermost and lowermost fins 5, and are brazed to the corresponding fins 5. Air flows in a direction indicated by an arrow X in FIG. 1.

The left header tank 2 is divided by a partition member 7 into upper and lower header sections 2a and 2b, at a position higher than the center of the left header tank 2 in the height direction. The right header tank 3 is divided by another partition member 7 into upper and lower header sections 3a and 3b, at a position lower than the center of the right header tank 3 in the height direction. A fluid inlet (not shown) is formed at the upper header section 2a of the left header tank 2, and an aluminum inlet member 8 having a fluid inflow passage 8a communicating with the fluid inlet is brazed to the upper header section 2a. A fluid outlet (not shown) is formed at the lower header section 3b of the right header tank 3, and an aluminum outlet member 9 having a fluid outflow passage 9a communicating with the fluid outlet is brazed to the lower header section 3b.

Each of the left and right header tanks 2 and 3 is composed of a tank body 11 having a plurality of tube insertion holes elongated in the front-rear direction, and aluminum closing members 12 brazed to opposite ends of the tank body 11 so as to close the openings at the opposite ends. The tank body 11 is composed of an aluminum pipe having a brazing material layer at least on the outer surface of the pipe; for example, a tubular member manufactured as follows. A blank plate formed of an aluminum brazing sheet having a brazing material layer on each of opposite surfaces thereof is formed into a tubular shape, and opposite side edge portions of the blank plate are caused to overlap partially, and are brazed to each other. Notably, the details of the header tank bodies 11 are not shown. Also, each of the header tank bodies 11 may be an aluminum extruded tube having a brazing material which is thermal-splayed onto the outer circumferential surface thereof.

As shown in FIG. 2, each heat exchange tube 4 has a plurality of refrigerant flow channels 4a juxtaposed in the width direction. The heat exchange tube 4 is formed through extrusion of an alloy which contains Mn in an amount of 0.2 to 0.3 mass %, Cu in an amount of 0.1 mass % or less, Fe in an amount of 0.2 mass % or less, and Si in an amount of 0.2 mass % or less, the balance being Al and unavoidable impurities. A Zn diffused layer 14 is formed in an outer surface layer portion of the peripheral wall 13 of the heat exchange tube 4. When the thickness of the peripheral wall 13 of the heat exchange tube 4 is represented by T [µm], the Zn concentration at the outermost surface of the outer surface layer portion (i.e., the Zn diffused layer 14) of the heat exchange tube 4 is represented by A [mass %], and the maximum depth of the Zn diffused layer 14 is represented by D [µm], conditions of T≤200, 0.57≤A≤1.5, D/T≤0.55, and 0.0055≤A/D≤0.025 are satisfied. Also, the spontaneous potential of the Zn diffused layer 14 is lower than the spontaneous potential of an inner portion 15 of the peripheral wall 13 of the heat exchange tube 4, the inner portion 15 being located on the inner side of the Zn diffused layer 14. It is preferred that the spontaneous potential of the Zn diffused layer 14 be 100 to 150 mV lower than the inner portion 15 of the peripheral wall 13 of the heat exchange tube 4.

The condenser 1 is manufactured by, for example, the following method.

First, the heat exchange tubes 4, the fins 5, the side plates 6, the partition members 7, a pair of tubular header tank body members each formed of aluminum and having a brazing material layer at least on the outer surface thereof, the closing members 12, the inlet member 8, and the outlet member 9 are prepared. A plurality of tube insertion holes are formed in each of the header tank body members.

Each of the heat exchange tubes 4 is formed through extrusion of an alloy which contains Mn in an amount of 0.2 to 0.3 mass %, Cu in an amount of 0.1 mass % or less, Fe in an amount of 0.2 mass % or less, and Si in an amount of 0.2 mass % or less, the balance being Al and unavoidable impurities. The peripheral wall of each heat exchange tube 4 has a thickness of 200 µM or less. In some cases, the thickness of the peripheral wall of each heat exchange tube 4 is not constant over the entire tube and changes locally. The expression "the peripheral wall of each heat exchange tube 4 has a thickness of 200 µm or less" means that the thickness of the thickest portion of the peripheral wall is 200 µm or less. Each of the fins 5 is formed of a brazing sheet composed of a core formed of aluminum and a skin layer formed of aluminum brazing material and covering opposite surfaces of the core.

Also, a dispersion is prepared by mixing and dispersing flux powder and Zn powder into a binder. The Zn powder has an average particle size of 3 to 5 µm and a maximum particle size of less than 10 µm. The flux powder is a non-corrosive fluoride-based flux mainly formed of a mixture of $KAlF_4$ and $KAlF_5$. The binder is a solution obtained by, for example, dissolving acrylic resin into 3-methoxy-3-methyl-1-butanol. Notably, in order to adjust the viscosity of the binder, 3-methoxy-3-methyl-1-butanol is added to the dispersion as a diluent.

Next, the dispersion is applied to the outer surface of each heat exchange tube 4, and the liquid component of the dispersion is evaporated, whereby the Zn powder and the flux powder are caused to adhere to the outer surface of each heat exchange tube 4 in such a manner that the adhering amount of the Zn powder becomes 1 to 3 g/m², the adhering amount of the flux powder becomes 15 g/m² or less, and the ratio of the adhering amount of the flux powder to the adhering amount of the Zn powder becomes (the flux powder adhering amount/the Zn powder adhering amount) becomes 1 or greater. The following two methods can be used so as to cause the Zn powder and the flux powder to adhere to the outer surface of each heat exchange tube 4.

According to the first method, the dispersion is applied to the outer surface of each heat exchange tube 4 by mean of spraying, and the heat exchange tube 4 is then heated and dried so as to evaporate the liquid component of the dispersion, to thereby cause the Zn powder and the flux powder to adhere to the outer surface of the heat exchange tube 4. According to the second method, the outer surface of each heat exchange tube 4 is heated in advance, the dispersion is applied to the outer surface of the heat exchange tube 4 by mean of roll coating, and the heat exchange tube 4 is then heated and dried so as to evaporate the liquid component of the dispersion, to thereby cause the Zn powder and the flux powder to adhere to the outer surface of the heat exchange tube 4.

Next, the pair of header tank body members each having tube insertion holes are disposed in such a manner that they are spaced from each other. Subsequently, the closing members 12 are disposed at the opposite ends of the header tank body members, and the partition members 7 are disposed in the header tank body members. Thus, header tank members are prepared. Also, the heat exchange tubes 4 and the fins 5 are disposed alternatingly, and opposite end portions of the heat exchange tubes 4 are inserted into the tube insertion holes of the header tank members. Further, the side plates 6 are disposed on the outer sides of the fins 5 at the opposite ends, and the inlet member 8 and the outlet member 9 are disposed.

Subsequently, the header tank members, each of which is composed of the header tank body member, the closing members 12, and the partition member 7, the heat exchange tubes 4, the fins 5, the side plates 6, the inlet member 8, and the outlet member 9 are provisionally fixed together, whereby a provisionally fixed assembly is formed.

After that, the provisionally fixed assembly is disposed in a brazing furnace, and is heated to a predetermined temperature within the furnace. Notably, when necessary, flux is applied to components other than the heat exchange tubes 4 by means of brush coating.

When the temperature of the provisionally fixed assembly reaches a brazing temperature as a result of the heating, the flux powder melts. As a result, the fins 5, the heat exchange tubes 4, and the side plates 6 are brazed together by making use of the molten flux and the skin layers of the fins 5. Also, by making use of the brazing material of the header tank body members, the heat exchange tubes 4 are brazed to the header tank body members, and the closing members 12 and the partition members 7 are brazed to the header tank body members. Simultaneously, the molten flux on the outer surface of each heat exchange tube 4 flows and spreads, and the molten Zn on the outer surface of each heat exchange tube 4 also flows and spreads. As a result, Zn diffuses into an outer surface layer portion of the peripheral wall 13 of each heat exchange tube 4, whereby the Zn diffused layer 14 is formed. In this manner, the condenser 1 is manufactured.

Next, concrete examples of the present invention will be described together with a comparative example.

EXAMPLES

Heat exchange tubes formed of extrudate, having a cross-sectional shape shown in FIG. 2, and having a width of 12 mm, a length of 650 mm, and a largest peripheral wall thickness (the thickness of the thickest portion of the peripheral wall) of 200 µm were formed through use of an alloy containing Mn in an amount of 0.25 mass %, the balance being Al and unavoidable impurities. The alloy did not contain Cu, and contained Fe in an amount of 0.2 mass % or less and Si in an amount of 0.2 mass % or less. Cu, Fe, and Si are unavoidable impurities. Also, corrugated fins were formed through use of a brazing sheet having a thickness of 70 μm. The brazing sheet was composed of an aluminum core, and skin layers formed of aluminum brazing material and covering the opposite surfaces of the core. The core contained Si in an amount of 0.45 mass %, Mn in an amount of 1.5 mass %, Zn in an amount of 1.5 mass %, the balance being Al and unavoidable impurities. The brazing material contained Si in an amount of 8.7 mass %, the balance being Al and unavoidable impurities. The cladding ratio of the skin layer of each fin was set to 10%.

Also, there were prepared a non-corrosive fluoride-based flux powder containing a mixture of $KAlF_4$ and $KAlF_5$ (the amount of $KAlF_5$ in the mixture: 10 to 40 mass %) in an amount of 90 mass % or more; a Zn powder having an average particle size of 3 to 5 μm and a maximum particle size of 10 μm (the Zn powder contained zinc oxide in amount of 5 mass %); a binder which was a solution obtained by dissolving acrylic resin into 3-methoxy-3-methyl-1-butanol; and a diluent composed of 3-methoxy-3-methyl-1-butanol. The Zn powder and the non-corrosive flux powder were mixed and dispersed into the binder and the diluent, whereby a dispersion was obtained. The weight ratio of all the components of the dispersion is such that the Zn powder:the non-corrosive flux powder:the binder:the diluent are 15 parts by weight: 45 parts by weight: 40 parts by weight: 27 parts by weight.

Subsequently, the dispersion was applied to the outer surface of each heat exchange tube by means of spraying, and was dried in a drier so as to evaporate the liquid component of the dispersion, whereby the Zn powder and the flux powder were caused to adhere to the outer surface of each heat exchange tube in such a manner that the adhering amount of the Zn powder became 1 to 3 $g/m^2$, and the adhering amount of the flux powder became 9 $g/m^2$ or less. At that time, the dispersion was applied to the outer surface of each heat exchange tube by means of spraying in such a manner that the adhering amount of the Zn powder became 1 $g/m^2$, 2 $g/m^2$, or 3 $g/m^2$.

After that, the plurality of heat exchange tubes and the plurality of corrugated fins were alternatively stacked and combined, and the heat exchange tubes and the corrugated fins were heated within a furnace filled with nitrogen gas in such a manner that the heat exchange tubes and the corrugated fins were maintained at 580 to 600° C. (actual temperature) for 3 minutes. Thus, the heat exchange tubes and the corrugated fins were brazed together, whereby a brazed assembly was obtained. The brazed assembly was obtained for each of three different Zn powder adhering amounts.

The Zn diffused layer formed in the outer surface layer portion of each heat exchange tube in each of the obtained three brazed assemblies was investigated. As a result, it was found that the Zn concentration at the outermost surface falls within a range of 0.57 to 1.4 mass %, and the thickness of the Zn diffused layer falls within a range of 60 to 105 μm.

Also, it was found that the spontaneous potential of the Zn diffused layer formed in the outer surface layer portion of each heat exchange tube in each of the three brazed assemblies falls within a range of −914 to −868 mV, and the spontaneous potential of a portion of the peripheral wall of each heat exchange tube located on the inner side of the Zn diffused layer is −766 mV.

Comparative Example

Heat exchange tubes formed of an aluminum extrudate, having a cross-sectional shape shown in FIG. 2, and having a width of 12 mm, a length of 650 mm, and a largest peripheral wall thickness (the thickness of the thickest portion of the peripheral wall) of 250 μm were formed through use of an alloy containing Cu in an amount of 0.45 mass % and Zn in an amount of 5.0 mass %, the balance being Al and unavoidable impurities.

Subsequently, a Zn film is formed on the outer surface of each heat exchange tube by means of thermal spraying.

After that, a plurality of heat exchange tubes and a plurality of corrugated fins having the same configuration as that used in the above-described example were alternatively stacked and combined, and the heat exchange tubes and the corrugated fins were heated within a furnace filled with nitrogen gas in such a manner that the heat exchange tubes and the corrugated fins were maintained at 580 to 600° C. (actual temperature) for 3 minutes. Thus, the heat exchange tubes and the corrugated fins were brazed together.

The Zn diffused layer formed in the outer surface layer portion of each heat exchange tube in the obtained brazed assembly was investigated. As a result, it was found that the Zn concentration at the outermost surface falls within a range of 1.0 to 2.5 mass %, and the thickness of the Zn diffused layer falls within a range of 85 to 105 μm.

Evaluation Test:

For the brazed assembly of the heat exchange tubes and the corrugated fins obtained in the example (the case where the Zn powder adhering amount is 2 $g/m^2$) and the brazed assembly of the heat exchange tubes and the corrugated fins obtained in the comparative example, a salt spray text prescribed in JASO (Japanese Automotive Standards Organization) M609 and M610 was performed for 336 days, and the state of corrosion was investigated. Table 1 shows the results of the test.

TABLE 1

| Test period (days) | | 56 | 84 | 112 | 168 | 336 |
|---|---|---|---|---|---|---|
| Examples | Maximum corrosion depth (μm) | 55 | 55 | 55 | 55 | 55 |
| | Maximum corrosion volume (mm³) | 0.077 | — | 0.140 | 0.164 | 0.207 |
| | Zn diffusion layer dissipation ratio (%) | 8.3 | — | 19.8 | 23.5 | 30.6 |
| Comparative Example | Maximum corrosion depth (μm) | 75 | 75 | 75 | 75 | 75 |
| | Maximum corrosion | — | 0.221 | — | 0.324 | — |

TABLE 1-continued

| Test period (days) | 56 | 84 | 112 | 168 | 336 |
|---|---|---|---|---|---|
| volume (mm³) | | | | | |
| Zn diffusion layer dissipation ratio (%) | — | 19.7 | — | 22.5 | |

As shown in Table 1, the developed product is smaller in the maximum corrosion depth at which the progress of corrosion of the Zn diffused layer stops and the speed at which the corrosion volume increases, as compared with the comparative product, and the Zn diffused layer dissipation ratio of the developed product is approximately equal to that of the comparative product. Accordingly, it is found that the developed product has an enhanced pitting corrosion resistance as compared with the comparative product, and can prolong the period during which occurrence of pitting corrosion is prevented.

The heat exchanger according to the present invention can be preferably used as a condenser for a car air conditioner mounted on an automobile.

What is claimed is:

1. A heat exchanger comprising heat exchange tubes formed of aluminum, and fins formed of aluminum and brazed to the heat exchange tubes, wherein
   each heat exchange tube is formed of an alloy which contains Mn in an amount of 0.2 to 0.3 mass %, Cu in an amount of 0.1 mass % or less, Fe in an amount of 0.2 mass % or less, and Si in an amount of 0.2 mass % or less, the balance being Al and unavoidable impurities;
   a Zn diffused layer is formed in an outer surface layer portion of the heat exchange tube;
   conditions of $T \leq 200$, $0.57 \leq A \leq 1.5$, $D/T \leq 0.55$, and $0.0055 \leq A/D \leq 0.025$ are satisfied, where T is a thickness [μm] of a peripheral wall of the heat exchange tube, A is a Zn concentration [mass %] at an outermost surface of the outer surface layer portion of the heat exchange tube, and D is a maximum depth [μm] of the Zn diffused layer; and
   a spontaneous potential of the Zn diffused layer is lower than a spontaneous potential of an inner portion of the peripheral wall of the heat exchange tube, the inner portion being located on the inner side of the Zn diffused layer.

2. A heat exchanger according to claim 1, wherein the spontaneous potential of the Zn diffused layer is 100 to 150 mV lower than that of the inner portion of the peripheral wall of the heat exchange tube, the inner portion being located on the inner side of the Zn diffused layer.

* * * * *